(12) United States Patent
Ono

(10) Patent No.: US 11,577,768 B2
(45) Date of Patent: Feb. 14, 2023

(54) CART

(71) Applicant: TOSHIBA TEC KABUSHIKI KAISHA, Tokyo (JP)

(72) Inventor: Yasuhiro Ono, Yokohama Kanagawa (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/386,526

(22) Filed: Jul. 27, 2021

(65) Prior Publication Data

US 2022/0177019 A1 Jun. 9, 2022

(30) Foreign Application Priority Data

Dec. 4, 2020 (JP) .............................. JP2020-202023

(51) Int. Cl.
*B62B 3/00* (2006.01)
*B62B 3/14* (2006.01)
*B62B 5/00* (2006.01)

(52) U.S. Cl.
CPC .......... *B62B 3/1424* (2013.01); *B62B 3/1412* (2013.01); *B62B 3/1428* (2013.01); *B62B 5/0096* (2013.01); *B62B 2203/10* (2013.01); *B62B 2206/06* (2013.01)

(58) Field of Classification Search
CPC ... B62B 3/1424; B62B 3/1412; B62B 3/1428; B62B 5/0096; B62B 2203/10; B62B 2206/06; B62B 3/00

USPC ..................................................... 280/33.992
See application file for complete search history.

(56) References Cited

U.S. PATENT DOCUMENTS

| | | | | |
|---|---|---|---|---|
| 7,934,647 | B1* | 5/2011 | Mims ................... | G07G 1/0081 235/431 |
| 8,120,190 | B2* | 2/2012 | Bravo ....................... | H02J 7/02 290/1 R |
| 11,080,680 | B2* | 8/2021 | Hagen ................... | G06Q 20/325 |
| 2011/0084659 | A1* | 4/2011 | Niemann ............... | H02J 7/0042 320/109 |
| 2015/0019391 | A1* | 1/2015 | Kumar ................. | G06Q 10/087 705/28 |
| 2016/0260161 | A1* | 9/2016 | Atchley ............... | G05D 1/0291 |
| 2019/0210849 | A1* | 7/2019 | High ....................... | B60L 53/63 |
| 2019/0272399 | A1* | 9/2019 | Iizaka ................... | B62B 5/0096 |
| 2020/0210982 | A1* | 7/2020 | Lapidos-Salaiz ..... | B62B 3/1424 |
| 2020/0307667 | A1* | 10/2020 | Tang ..................... | G05D 1/0238 |
| 2021/0177163 | A1* | 6/2021 | Cohn ..................... | B62B 3/1428 |

* cited by examiner

*Primary Examiner* — John D Walters
*Assistant Examiner* — Hilary L Johns
(74) *Attorney, Agent, or Firm* — Kim & Stewart LLP

(57) ABSTRACT

A cart includes a frame, a holding portion supported by the frame and in which a product is stored, a lifting unit configured to raise and lower the holding portion, an imaging device directed towards an inside of the holding portion, and a controller. The controller is configured to acquire an image of a product captured by the imaging device, determine whether the product has been continuously imaged by the imaging device over a predetermined time period, and upon determining that the product has been imaged over the predetermined time period, control the lifting unit to lower the holding portion.

20 Claims, 9 Drawing Sheets

CART

CROSS-REFERENCE TO RELATED APPLICATIONS

This application is based upon and claims the benefit of priority from Japanese Patent Application No. 2020-202023, filed Dec. 4, 2020, the entire contents of which are incorporated herein by reference.

FIELD

Embodiments described herein generally relate to a cart such as a shopping cart or the like.

BACKGROUND

In recent years, a shopping cart provided with a scanner that reads information from a product has been used in larger retail stores such as a supermarket. Such a cart can be designed so that the scanner automatically reads product information when the product is placed in the cart. For example, with appropriate settings of an imaging direction and range for the scanner an image of the product in the cart can be acquired.

However, in a case where many products are placed in the cart, some of the products may be located close to the scanner. In such a case, a product near the scanner may hinder reading of another new product, or a product that has been read may be read twice.

DETAILED DESCRIPTION

In general, according to one embodiment, a cart includes a frame, a holding portion supported by the frame and in which a product is stored, a lifting unit configured to raise and lower the holding portion, an imaging device directed towards an inside of the holding portion, and a controller. The controller is configured to acquire an image of a product captured by the imaging device, determine whether the product has been continuously imaged by the imaging device over a predetermined time period, and upon determining that the product has been imaged over the predetermined time period, control the lifting unit to lower the holding portion.

First Embodiment

Figure 1:
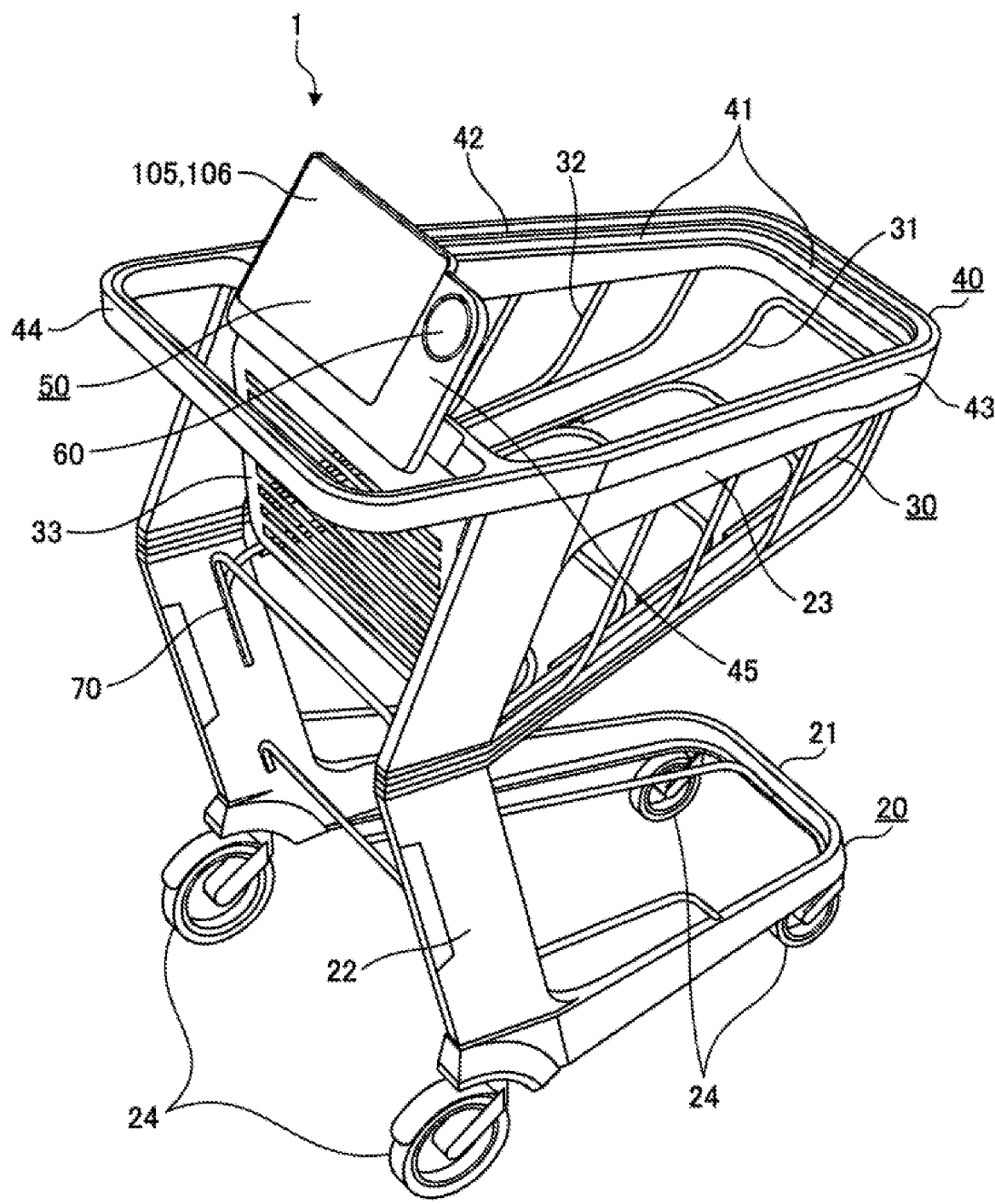
FIG. 1 is an external perspective view of a cart according to an embodiment as seen from above.

Certain non-limiting example embodiments will be described with reference to the drawings. FIG. 1 is an external perspective view a cart 1 according to a first embodiment as viewed from above. The cart 1 facilitates transportation of a product in a store and comprises a frame 20, a holding portion 30, a scanner 41, an illumination element 42, a frame portion 43, a handle 44, a terminal support portion 45, a display operation portion 50, a settlement device 60, and a lifting unit 70.

Figure 2:
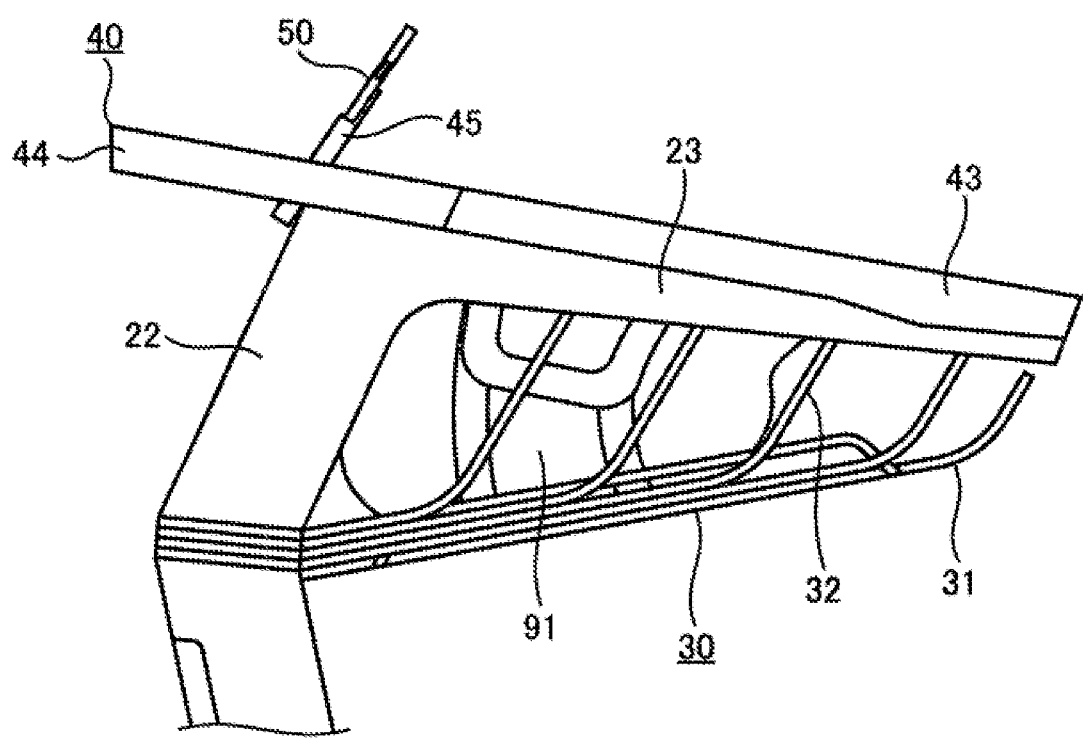
FIG. 2 is a side view of a holding portion of a cart.

The holding portion 30 is a basket-like container for storing a product to be purchased by a customer, and includes a bottom portion 31, a side wall portion 32, and a flap 33. FIG. 2 is a side view of the holding portion 30, and shows a use state in which a shopping bag 91 provided by the customer is placed or hung on the holding portion 30.

The bottom portion 31 supports the product (s) from below. The side wall portion 32 prevents the product(s) from falling off the bottom portion 31 to sides.

The frame 20 comprises a base portion 21, column portions 22, a frame portion 23, and wheels 24, and holds the holding portion 30 at a predetermined height. The wheels 24 are attached to a lower end portion of the base portion 21. Each of the column portions 22 has a columnar shape and stands on the base portion 21 to support the frame portion 23. The column portions 22 support the bottom portion 31 in a cantilevered state. The frame portion 23 supports an upper end portion of the side wall portion 32 of the holding portion 30.

The frame portion 43 is attached to the frame portion 23 and surrounds the upper edge portion of the frame portion 23. The scanner 41 and the illumination element 42 are provided on the inner peripheral surface of the frame portion 43.

The scanner 41 is an imaging unit, which is formed of, for example, a plurality of imaging sensors. The scanner 41 has a line-shaped imaging region that is narrower in the height direction and wider in the lateral direction. The scanner 41 is provided towards the inside of the holding portion 30 to cover a portion of a path along which the product will travel when being placed in the cart 1. The scanner 41 captures an image of the inside of the frame portion 44. The scanner 41 also captures an image of the product passing through the region surrounded by the frame portion 43. The illumination element 42 is a lighting device that illuminates the products being imaged by the scanner 41 to facilitate clear imaging.

The image captured by the scanner 41 is used for a product specifying process based on a code symbol such as a barcode or a product specifying process using an object recognition technique. In the case of the specifying process of the product based on the code symbol, information (e.g., product ID) obtained by reading the code symbol extracted from the captured image is referred to a product master 121 (see FIG. 6A), so that product information can be acquired. When products are to be identified by object recognition technology (generic objection recognition), the product information can be acquired by searching the product master 121 for the feature data (feature value data) corresponding to the appearance of the product as extracted from the captured image acquired when the product is being placed in the cart 1.

The handle 44 is a portion to be gripped by the customer when moving the cart 1, and is connected to the frame portion 43. Here, the side where the handle 44 is present on the front side of the customer who holds the handle 44, however, in the following description the side of the cart 1 where the handle 44 is present is referred to as the rear side of the cart 1, and the side away from the handle 44 is referred to as the front side of the cart 1.

The terminal support portion 45 is provided between the frame portion 43 and the handle 44, and supports the display operation portion 50. The terminal support unit 45 is provided with a settlement device 60.

The flap 33 of the holding portion 30 is supported by the frame portion 43 in a suspended state below the terminal support portion 45. The flap 33 is pivotable about an upper end portion of the frame portion 43 in the forward direction (that is, inward of the holding portion 30). The flap 33 is rotatable only within the holding portion 30 and is not rotatable further rearward than the state illustrated in FIG. 1. With this structure, the product stored in the holding portion 30 will not drop from the rear side of the holding portion 30.

Figure 3:
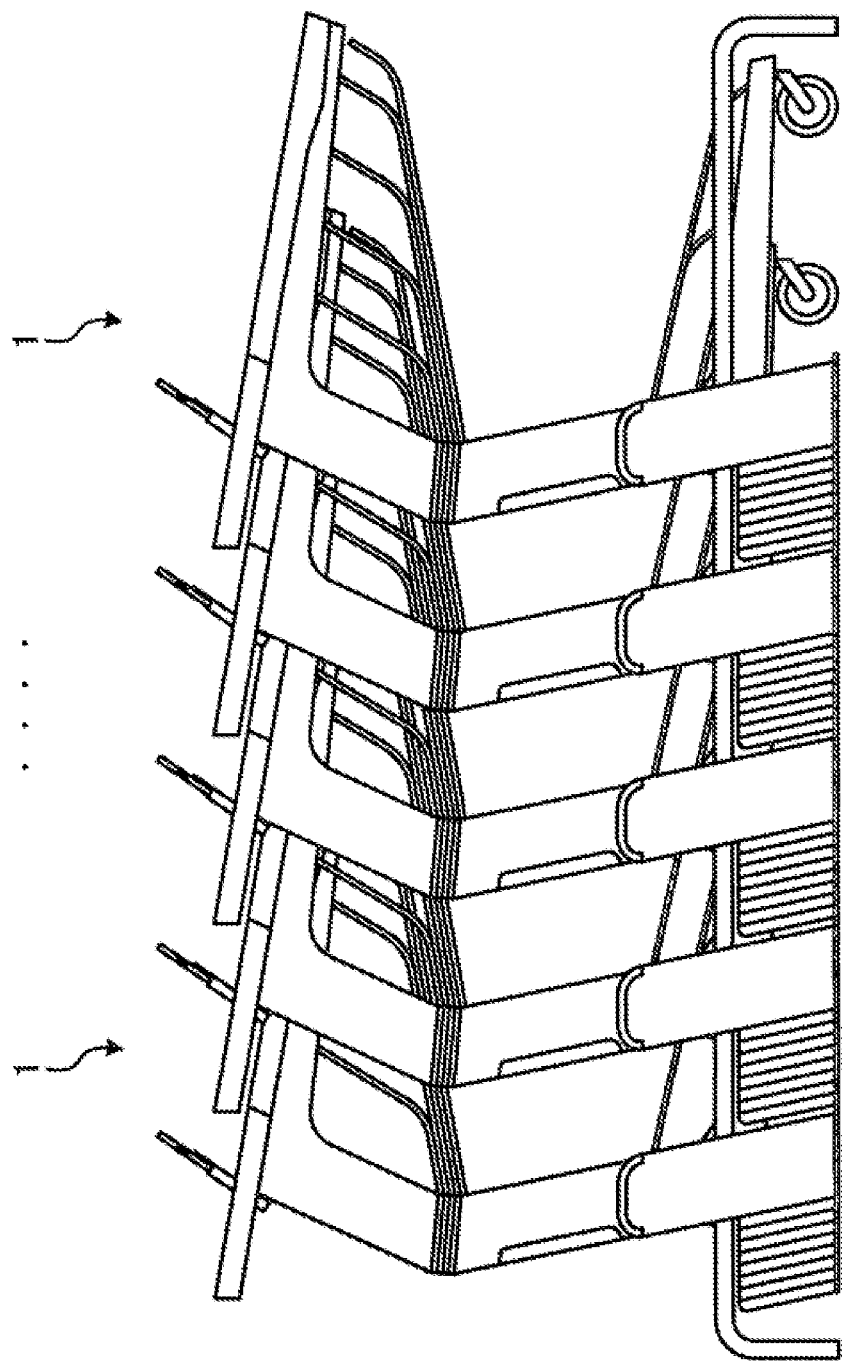
FIG. 3 is a side view of a cart illustrating a state in which a plurality of carts is stored in an overlapping manner.

FIG. 3 is a side view of a plurality of carts 1 stored in an overlapping (stacked) manner. As described above, the flap 33 is rotatable into the holding portion 30 area. The bottom portion 31 angles downward from the front to the rear. The frame portion 23 angles upward from the front toward the rear. With such a structure, the plurality of carts 1 can be stored in an overlapping manner along the front-rear direction. That is, when the front end portion of the holding portion 30 of a cart 1 is pressed against the flap 33 of another cart 1 from behind, the flap 33 of the other cart 1 is rotated and pushed up. When the first cart 1 is further pushed forward, the holding portion 30 of the cart 1 enters the holding portion 30 of the other cart 1.

The display operation portion 50 is a tablet-type terminal apparatus that displays information to the customer and receives an operation instruction from the customer.

The settlement device 60 is a non-contact reader/writer permitting settlement with electronic money (electronic payment methods) or the like.

Figure 4A:
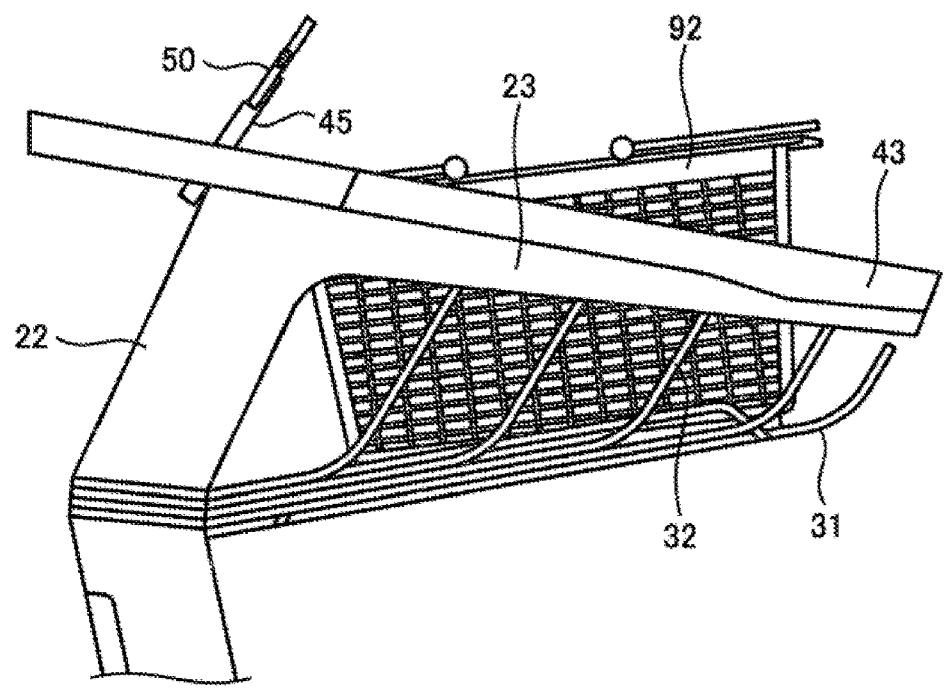
FIG. 4A is a side view of a holding portion in which a shopping basket is placed.
Figure 4B:
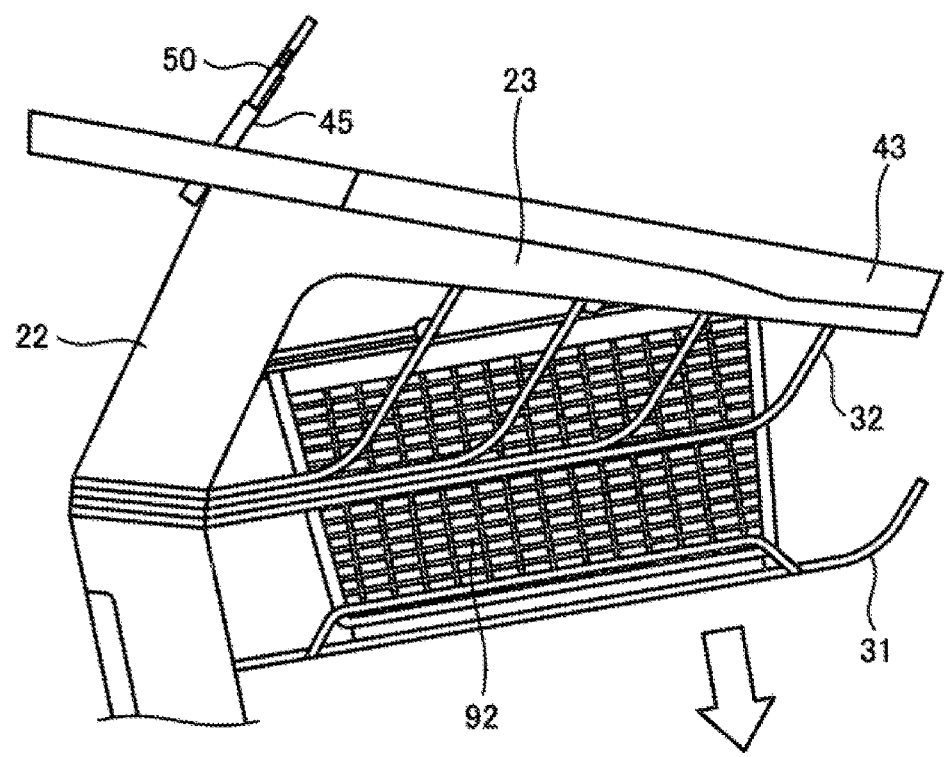
FIG. 4B is a side view of a holding portion having a bottom portion lowered to a level at which a shopping basket is not detected.

FIG. 4A is a side view of the holding portion 30 in which a shopping basket 92 is placed. FIG. 4B is a side view of the holding portion 30 where the bottom portion 31 of the holding portion 30 is lowered to a level at which the shopping basket 92 is not detected by the scanner 41.

In the cart 1 of the first embodiment, the position of the bottom portion 31 is lowered by the lifting unit 70 when the imaging of a product by the scanner 41 continues for more than a predetermined time (for example, two seconds). For example, as illustrated in FIG. 4A, in a state in which the shopping basket 92 is placed on the bottom portion 31, since the shopping basket 92 interferes with imaging by the scanner 41, the lifting unit 70 lowers the bottom portion 31 until the shopping basket 92 is not imaged by the scanner 41.

Figure 5A:
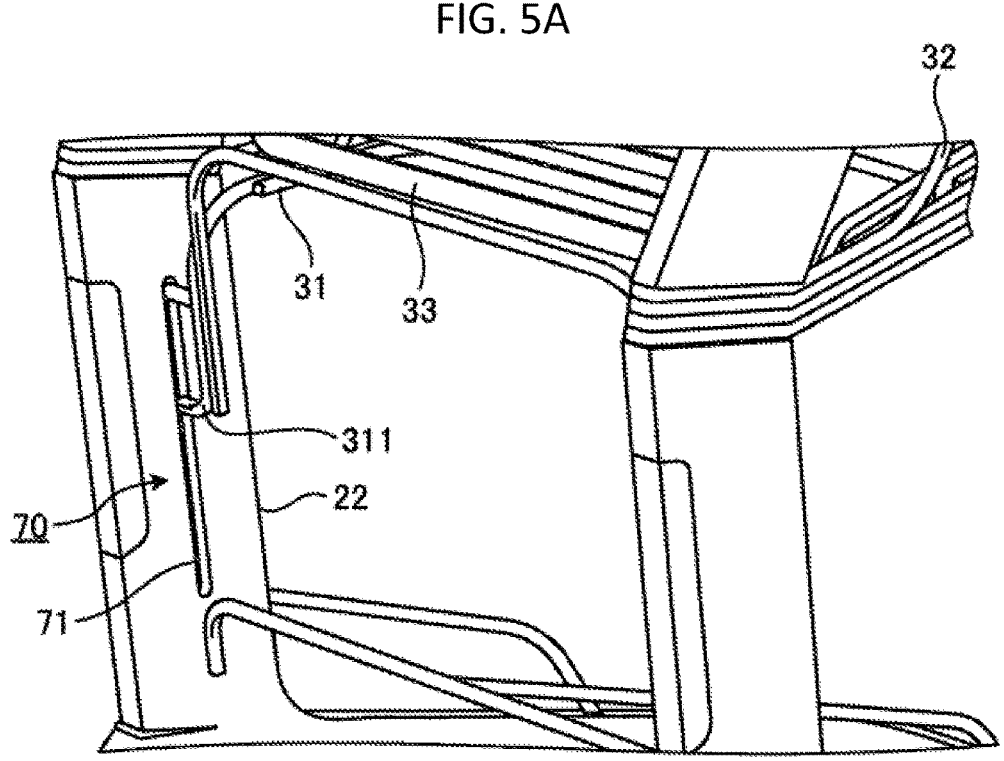
FIG. 5A is a perspective view illustrating an appearance of a lifting unit.
Figure 5B:
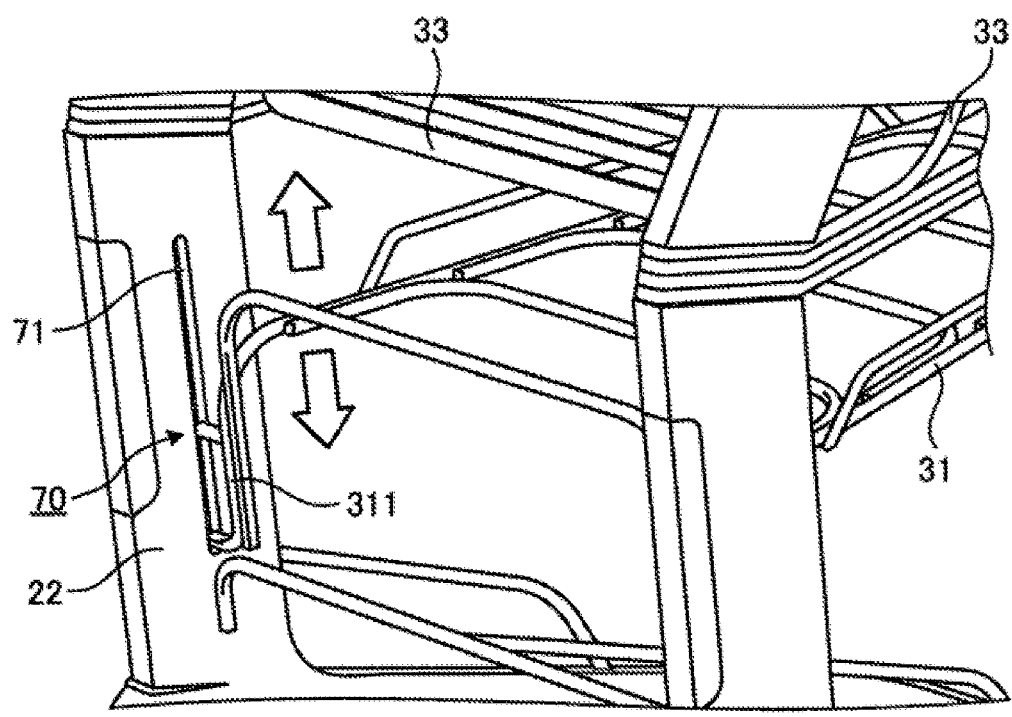
FIG. 5B is a perspective view illustrating a lifting unit in a state in which a bottom portion of a holding portion is lowered.

FIG. 5A is a perspective view of the lifting unit 70. FIG. 5B is a perspective view of the lifting unit 70 in a state in which the bottom portion 31 of the holding portion 30 is lowered.

The lifting unit 70 is installed in the inside of one or both of the column portions 22 and raises and lowers the bottom portion 31 of the holding portion 30. For example, the lifting unit 70 includes a groove 71, a slider 311, a rack, a pinion, and a motor 72 (see FIG. 6A). In this example, the groove 71 extends along the vertical direction in the column portion 22. The slider 311 extends downward from both side portions of the rear end portion of the bottom portion 31. The rack is provided in the column portion 22 and is connected to the slider 311 inserted into the groove 71. The pinion is engaged with the rack and is also provided in the column portion 22. The motor 72 is, for example, a stepping motor, and rotates the pinion under control of a controller 110 (see FIG. 6A, described later).

Another example of the lifting unit 70 includes a hydraulic cylinder, an air cylinder, a rotary actuator, or the like instead of the rack, the pinion, and the motor 72 of the above example.

Figure 6A:
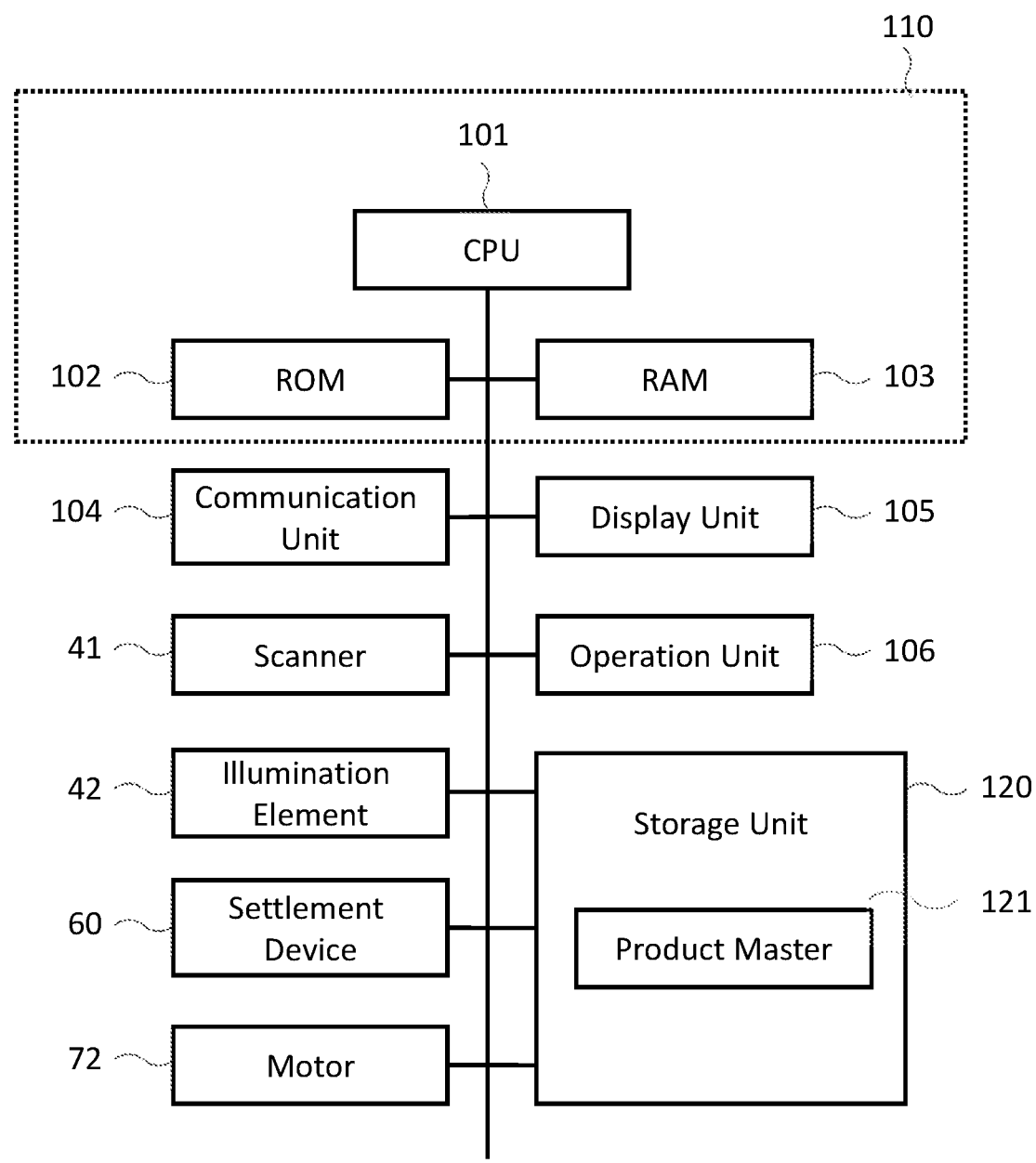
FIG. 6A is a hardware block diagram of a cart.
Figure 6B:
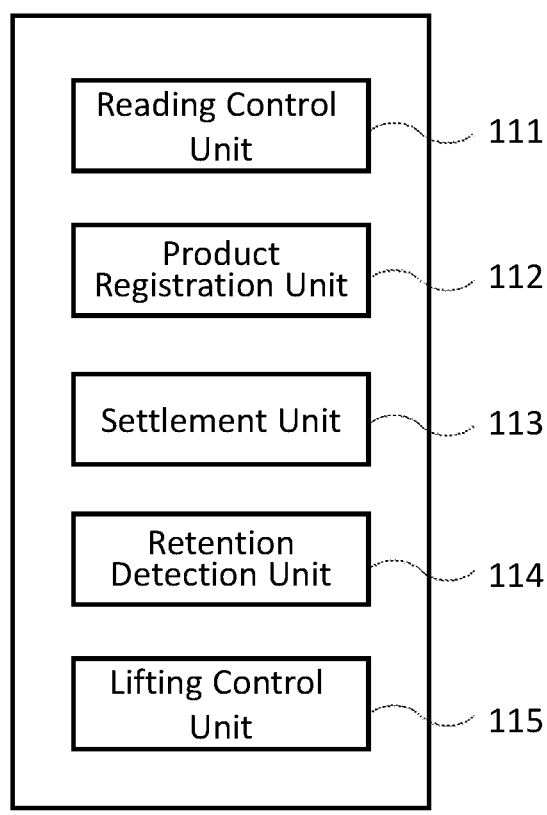
FIG. 6B is a block diagram illustrating certain aspects related to functions of a cart.

FIG. 6A is a hardware block diagram of the cart 1. FIG. 6B is a functional block diagram of the cart 1. The cart 1 includes a CPU (Central Processing Unit) 101, a ROM (Read Only Memory) 102, a RAM (Random Access Memory) 103, a communication unit 104, a display unit 105, an operation unit 106, a storage unit 120, and the like. Here, the CPU 101, the ROM 102, the RAM 103, the communication unit 104, the display unit 105, the operation unit 106, and the storage unit 120 are incorporated in the display operation portion 50. The display operation portion 50 is communicably connected to the scanner 41, the illumination element 42, the settlement device 60, and the motor 72.

The CPU 101 is a processor to control each unit of the cart 1. The ROM 102 stores various programs and data. The RAM 103 is a work memory where programs and various types of data are temporarily stored. In an embodiment, the CPU 101, the ROM 102, and the RAM 103 make up the controller 110 configured to control the operations of the cart 1.

The storage unit 120 is a storage medium such as an HDD (Hard Disk Drive) or a flash memory, and maintains stored data even when power is shut down. The storage unit 120 stores programs executable by the CPU 101 and various setting information. For example, the storage unit 120 stores an application program capable of executing settlement processing of a product (for example, a program for electronic settlement).

The storage unit 120 stores, for example, a product master 121. The product master 121 is a table or a database that stores a product ID, a product name, a price, and the like of a product sold in a store. The product ID is identification information for identifying a product. The product name is a name of the product corresponding to the product ID. The price is a unit price of the product corresponding to the product ID.

In a case where object recognition is performed using the image captured by the scanner 41, the product master 121 also stores feature data of a product. Thus, the product ID of the product can be acquired by searching the product master 121 using the feature data extracted from the captured image.

The communication unit 104 is a communication interface circuit connectable to a LAN (Local Area Network). A communication unit 104 communicates with an external apparatus such as a store server via the LAN.

The display unit 105 is a display such as an LCD (Liquid Crystal Display), and displays various information and screens in accordance with the control of the CPU 101. The operation unit 106 is a touch panel provided on a surface of the display unit 105, and outputs a signal corresponding to the user operation to the CPU 101. The operation unit 106 may be a keyboard having various operation keys.

FIG. 6B is a block diagram of the cart 1 illustrating aspects related to various functions of the cart 1. The CPU 101 or the controller 110 performs the functions of image capturing by the scanner 41, lighting by the illumination element 42, electronic payment processing by the settlement device 60, and raising and lowering of the lifting unit 70 according to the programs stored in the ROM 102 and/or the storage unit 120 and loaded into the RAM 103. In particular, the controller 110 performs the functions of a reading control unit 111, a product registration unit 112, a settlement unit 113, a retention detection unit 114, and a lifting control unit 115, as shown in FIG. 6B.

Some or all of the above-described functional units 111 to 115 may be implemented as software or one or more programs stored in the ROM 102 and/or the storage unit 120 and executed by the CPU 101. Additionally, some or all of the units 111 to 115 may be implemented as hardware or one or more dedicated circuits or the like mounted on the cart 1 or the display operation portion 50.

The reading control unit 111 controls the scanner 41 to capture and output an image.

The product registration unit 112 searches the product master 121 using information obtained by imaging a product with the scanner 41 (for example, a code symbol such as a barcode in the captured image) to acquire corresponding product information such as a product name or a price. The product registration unit 112 may also or instead acquire the product information by object recognition techniques based on comparison of feature value data extracted from the captured image to known feature values for different product types or the like.

In this example, the product registration unit 112 searches the product master 121 for product information using a code obtained by decoding a code symbol in a captured image. In addition, the product registration unit 112 may also extracts feature value data for the product based on the appearance of the product in the captured image, and searches the product master 121 for the product information using the extracted feature value data (object recognition). The extraction of the feature value data by object recognition may be performed by an external device such as a store server connected via the communication unit 104. In such a case, the product registration unit 112 outputs the captured image to the external apparatus and acquires the product information such as the corresponding product ID from the external device.

The product registration unit 112 registers or stores the acquired product information in the storage unit 120. The settlement unit 113 calculates the total price of registered products in the storage unit 120, and executes settlement using the settlement device 60.

When the imaging of a product by the imaging unit continues for more than a predetermined time (for example, two seconds), the retention detection unit 114 detects that the product or the like is retained. When the retention detection unit 114 detects the retention, the lifting control unit 115 causes the lifting unit 70 to lower the bottom portion 31.

Figure 7:
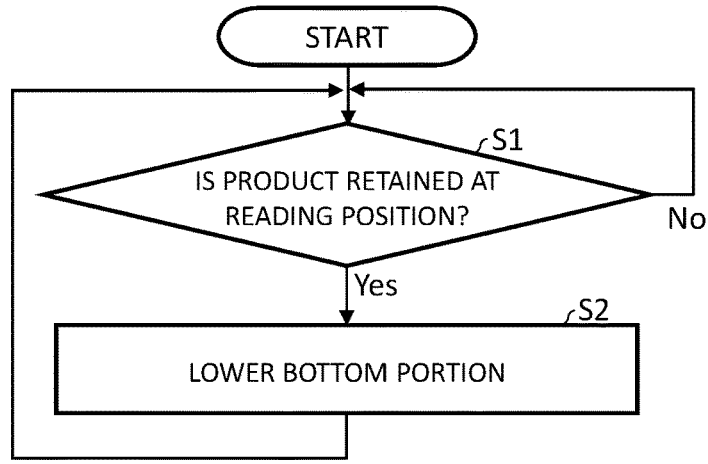
FIG. 7 is a flowchart of processing performed by a cart.

In such a configuration, the controller 110 performs control to raise and lower the bottom portion 31 of the holding portion 30. FIG. 7 is a flowchart of processing performed by the controller 110 of the cart 1.

The controller 110 performs the function of the retention detection unit 114 to determine whether a product is retained at the reading position of the scanner 41 (step S1). In this determination, when the same product continues to appear in the image captured by the scanner 41 for more than two seconds, for example, it is determined that the product is retained. When it is determined that the product is not retained in step S1 (No in step S1), the controller 110 returns the process to the beginning. In step S1, when it is determined that the product is retained (Yes in step S1), the controller 110 performs the function of the lifting control unit 115 to lower the bottom portion 31 by a predetermined value, and return the process to the beginning (step S2). By performing the above-described processes, the bottom portion 31 is lowered until any product is not detected at the reading position of the scanner 41.

According to the above-described embodiments, since the bottom portion 31 of the holding portion 30 that stores products is appropriately lowered in a case where the loaded amount of the products is large and the loaded products are close to the scanner 41, it is possible to prevent the reading of the product information by the scanner 41 from being continuously hindered. Therefore, it is possible to provide a cart 1 in which reading of product information will not be inhibited by an already loaded product.

By lowering the bottom portion 31 according to the loaded amount of the products, the side wall portion 32 of the holding portion 30 supports products loaded beyond the capacity of the shopping basket 92, and thus it is possible to prevent the products from falling from the holding portion 30.

Second Embodiment

A second embodiment will be described. In general, this second embodiment can be considered a modification of the first embodiment. Unless otherwise noted, components in the second embodiment with the same reference numerals as those described for the first embodiment can be considered as the same as in the first embodiment.

Figure 8:
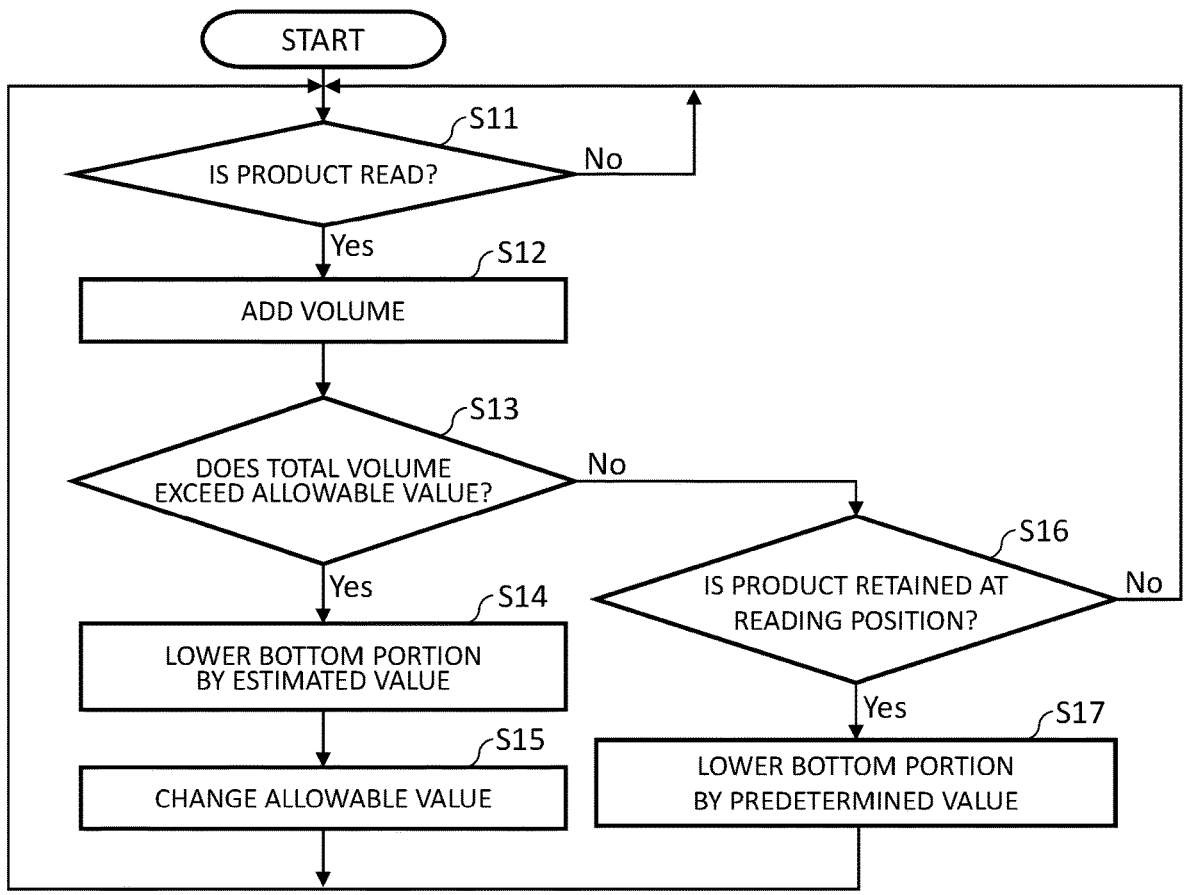
FIG. 8 is a flowchart of another example processing performed by a cart.

FIG. 8 is a flowchart of processing performed by the controller 110 or the cart 1. The controller 110 lowers the bottom portion 31 based on the loading height predicted from the volume of a product in addition to the process in the first embodiment. Each step will be described below. Further, the product master 121 stores the volume of the product in addition to the product ID, the product name, the price and the like. Further, the storage unit 120 stores the volume of the shopping basket 92. Hereinafter, the volume of products that can be stored in the shopping basket 92 is referred to as an "allowable value".

The controller 110 performs the function of the product registration unit 112 and wait for the reading of a product (No in step S11). The controller 110 obtains the corresponding product information from the product master 121 based on the captured image output by the scanner 41 (Yes in step S11), and adds the volume of the product to the total volume of products that have been read (step S12). Next, the controller 110 performs the function of the retention detection unit 114 and determine whether the total volume of the products exceeds the allowable value (step S13).

In a case where the total volume of the products exceeds the allowable value in step S13 (Yes in step S13), the controller 110 performs the function of the lifting control unit 115 and lowers the bottom portion 31 by an estimated value (step S14). Here, the estimated value is a value of a height predicted to be increased by the last registered product at that time. Next, the controller 110 adds a value obtained by multiplying the area of the bottom surface of the bottom portion 31 by the estimated value to the allowable value (step S15), and returns the process to the beginning.

In addition, in step S13, when the total volume of the products does not exceed the allowable value (No in step S13), the controller 110 performs the function of the retention detection unit 114 and determines whether any product is retained at the reading position of the scanner 41 (step S16). When it is determined that any product is not retained in step S16 (No in step S16), the controller 110 returns the process to the beginning. In step S16, when it is determined that a product is retained (Yes in step S16), the controller 110 performs the function of the lifting control unit 115 and lowers the height of the bottom portion 31 by a predetermined value and returns the process to the beginning (step S17).

Since the total volume of the loaded products is updated every time another product is loaded and the bottom portion 31 is lowered when the volume exceeds the allowable value, it is possible to prevent the occurrence of a reading failure by the scanner 41 by lowering the bottom portion 31 before the reading by the scanner 41 is inhibited.

Third Embodiment

A third embodiment will be described. In general, this third embodiment can be considered a modification of the first embodiment. Unless otherwise noted, components in the third embodiment with the same reference numerals as those described for the first embodiment are the same as in the first embodiment.

The cart 1 of the third embodiment does not include the scanner 41 and the illumination element 42 on the frame portion 43. The display operation portion 50 is a tablet-type terminal device comprising a camera in this third embodiment. The camera is positioned toward the inside of the holding portion 30 so as to capture an image of a product to be loaded. Instead of the scanner 41 in the first embodiment, the camera in the display operation portion 50 captures and outputs an image of the product.

However, the same effects as those of the other embodiments can be achieved by the processing illustrated in FIGS. 7 and 8.

Fourth Embodiment

A fourth embodiment will be described. In general, this fourth embodiment can be considered a modification example of the third embodiment. Unless otherwise noted, components in the fourth embodiment with the same reference numerals as those described for the third embodiment can be considered the same as those in the third embodiment.

Figure 9:
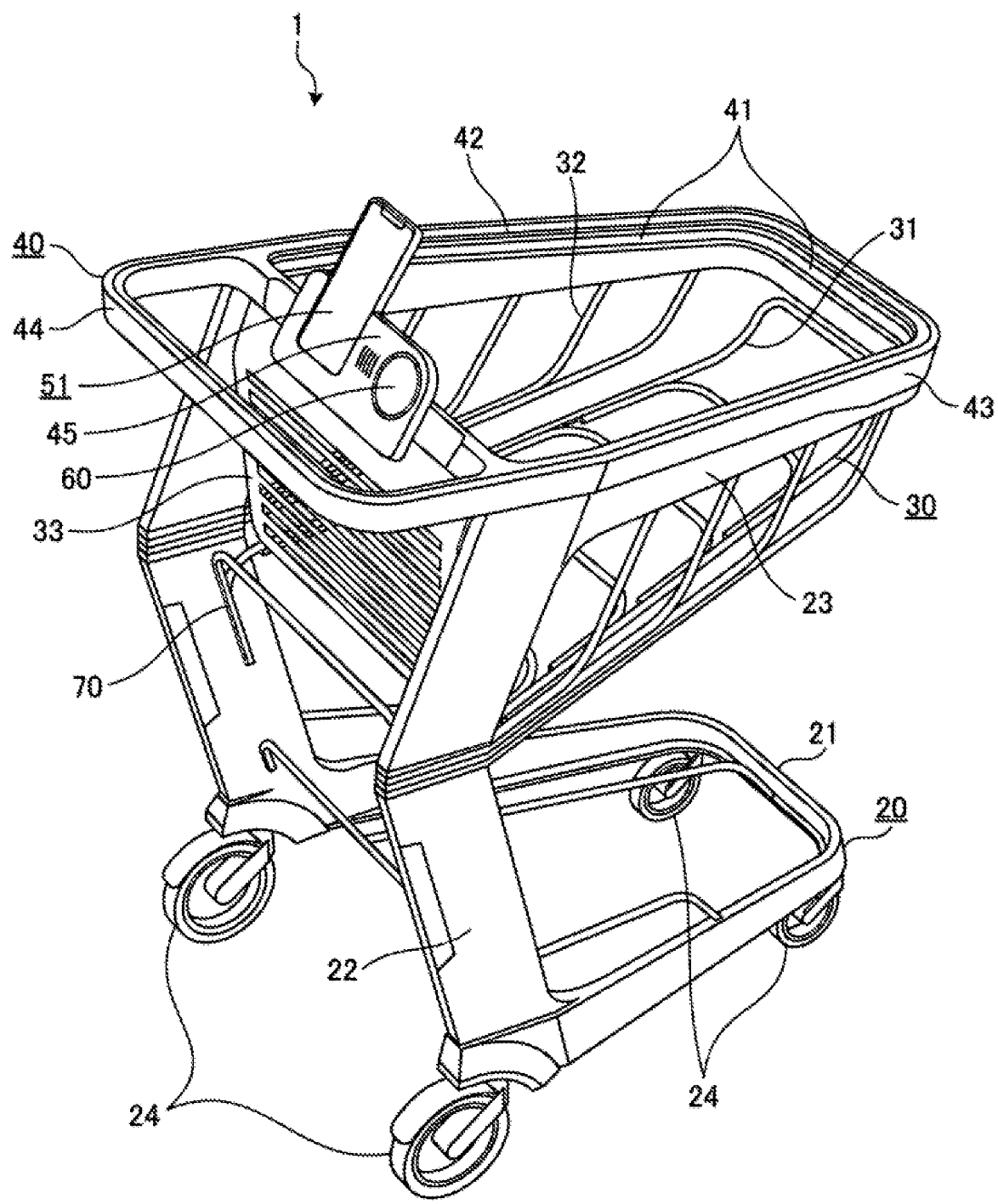
FIG. 9 is a side view of a cart where a smartphone-type terminal is installed.

FIG. 9 is a side view of the cart 1 on which a smartphone-type portable terminal 51 is installed. As shown in FIG. 9, the cart 1 of the fourth embodiment does not include the display operation portion 50. The cart 1 of the fourth embodiment is capable of mounting, for example, a portable terminal 51 that is otherwise carried by a customer. That is, the portable terminal 51 may be a smartphone or the like owned by the customer himself/herself. In this case, the portable terminal 51 may need to install the appropriate application software or access a particular website to recognize and register a product at the store. In this example, the cart 1 and the portable terminal 51 may be considered to collectively make up a cart system.

In such a configuration, the portable terminal 51 may have some or all of the configurations and functional units of the display operation portion 50 described in conjunction with in the first embodiment. Examples thereof include a camera (see the third embodiment), a communication unit 104, a display unit 105, an operation unit 106, a product registration unit 112, a settlement unit 113, and a retention detection unit 114. Furthermore, the product master 121 is generally not stored in the portable terminal 51, but rather is stored in an external device such as a store server and accessed through the communication unit 104. The controller 110 of the cart 1 of the fourth embodiment and the portable terminal 51 can communicate with each other via a wired or wireless network.

Fifth Embodiment

A fifth embodiment will be described. In general, this fifth embodiment can be considered a modification of the first embodiment. Unless otherwise noted, components in the fifth embodiment with the same reference numerals as those described for the first embodiment can be considered the same as those in the first embodiment.

When the retention of a product is detected, the controller 110 (functioning as retention detection unit 114) causes the display unit 105 to display information for guiding the issue and a handling method. In the guidance, the controller 110 causes the display unit 105 to display a button with a message such as "The height of the stacked products is too high and the next product cannot be scanned. Please press the button to lower the basket."

When the operation on the button is detected by the operation unit 106 that is a touch panel, the controller 110 (functioning as lifting control unit 115) controls each unit to lower the bottom portion 31 by a height corresponding to the number of operations on the button. The same effects as those of the other described embodiments can be achieved similarly achieved with the fifth embodiment.

Sixth Embodiment

A sixth embodiment will be described. In general, this sixth embodiment can be considered a modification example of the first embodiment. Unless otherwise noted, components in the sixth embodiment with the same reference numerals as those described for the first embodiment can be considered the same as those in the first embodiment.

When the shopping bag 91 provided by a customer is allowed to be used instead of the shopping basket 92, the cart 1 may include a handle location for the shopping bag 91, a hook for hanging the shopping bag 91, or the like. In such a case, the lifting control target of the lifting unit 70 and the lifting control unit 115 includes not only the bottom portion 31 but also a portion where the hook or the like is provided.

Also in the sixth embodiment, the same effects as those of the other described embodiments can be achieved with the processing illustrated in FIGS. 7 and 8.

One or more programs executed by the cart 1 can be stored in the ROM 102, the storage unit 120, or the like in advance.

The programs executed by the cart 1 according to the embodiments may be recorded in a non-transitory computer-readable recording medium such as a CD-ROM, a flexible disk (FD), or a CD-R, DVD (Digital Versatile Disk) and provided as installable or executable files.

The programs executed by the cart 1 according to the embodiments may be stored on a computer connected to a network, such as the Internet, and downloaded via the network. Furthermore, it is possible to provide and distribute the programs executed by the cart 1 via a network such as the Internet.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without depart-

What is claimed is:

1. A cart, comprising:
a frame;
a holding portion supported by the frame to be movable along a first direction;
an imaging device;
a motor connected to the holding portion and controlled to move the holding portion along the first direction; and
a controller configured to:
acquire an image from the imaging device when the holding portion is at a predetermined position along the first direction,
determine whether a product is continuously present in multiple images acquired from the imaging device over a predetermined time period, and
upon determining that the product is continuously present in the multiple images over the predetermined time period, control the motor to move the holding portion along the first direction away from the imaging device.

2. The cart according to claim 1, wherein the controller is further configured to:
determine whether a total volume of one or more products present in the image acquired from the imaging device exceeds a predetermined volume, and
upon determining that the total volume exceeds the predetermined volume, control the motor to move the holding portion along the first direction away from the imaging device.

3. The cart according to claim 1, wherein the motor is controlled to move the holding portion to a position where no product placed in the holding portion is imaged by the imaging device.

4. The cart according to claim 1, further comprising:
a display, wherein
the controller is further configured to, upon determining that the product is continuously present in the multiple images over the predetermined time period, control the display to display a screen showing an alert.

5. The cart according to claim 4, wherein the screen includes a button through which an instruction to move the holding portion along the first direction can be input.

6. The cart according to claim 1, wherein the holding unit includes a slider that slides along a groove.

7. The cart according to claim 6, wherein the frame includes a column portion in which the groove is formed.

8. The cart according to claim 1, wherein the imaging device is disposed along an upper edge of the frame.

9. The cart according to claim 8, further comprising:
a lighting device disposed along the upper edge of the frame.

10. The cart according to claim 1, further comprising:
a terminal attached to the frame and including the imaging device and the controller.

11. The cart according to claim 1, further comprising:
a hook for handing a bag in which a product is stored, wherein
the motor is further control to move the hook.

12. The cart according to claim 1, further comprising:
a wireless card reader and writer through which a settlement for the product is performed.

13. A cart system, comprising:
a cart that includes:
a frame,
a holding portion supported by the frame to be movable along a first direction,
a motor connected to the holding portion and controlled to move the holding portion along the first direction
a terminal holder on the frame; and
a mobile terminal that is connectable to the cart via the terminal holder, includes a camera, and is configured to:
acquire an image from the camera when the holding portion is at a predetermined position along the first direction,
determine whether a product is continuously present in multiple images acquired from the camera over a predetermined time period, and
upon determining that the product is continuously present in the multiple images over the predetermined time period, control the motor to move the holding portion along the first direction away from the camera.

14. The cart system according to claim 13, wherein the mobile terminal is further configured to:
determine whether a total volume of one or more products present in the image acquired from the camera exceeds a predetermined volume, and
upon determining that the total volume exceeds the predetermined volume, control the motor to move the holding portion along the first direction away from the imaging device.

15. The cart system according to claim 13, wherein the motor is controlled to move the holding portion to a position where no product placed in the holding portion is imaged by the camera.

16. The cart system according to claim 13, wherein the mobile terminal is further configured to, upon determining that the product is continuously present in the multiple images over the predetermined time period, display a screen showing an alert.

17. The cart system according to claim 16, wherein the screen includes a button through which an instruction to move the holding portion along the first direction can be input.

18. The cart system according to claim 13, wherein the holding unit includes a slider that slides along a groove.

19. The cart system according to claim 18, wherein the frame includes a column portion in which the groove is formed.

20. A method for controlling a product holding portion of a cart that includes an imaging device and a motor connected to the product holding portion and controlled to move the product holding portion along a first direction, the method comprising:
acquiring an image from the imaging device when the holding portion is at a predetermined position along the first direction;
determining whether a product is continuously present in multiple images acquired from the imaging device over a predetermined time period; and
upon determining that the product is continuously present in the multiple images over the predetermined time period, controlling the motor to move the product holding portion along the first direction away from the imaging device.

* * * * *